United States Patent
Letocart et al.

(10) Patent No.: US 10,144,249 B2
(45) Date of Patent: Dec. 4, 2018

(54) DEVICE FOR THE PRODUCTION OF TREAD OF A TIRE CASING

(71) Applicants: Arnaud Letocart, Clermont-ferrand (FR); Gérard Crosnier, Clermont-ferrand (FR); Christophe Ougier, Clermont-ferrand (FR)

(72) Inventors: Arnaud Letocart, Clermont-Ferrand (FR); Gerard Crosnier, Clermont-Ferrand (FR); Christophe Ougier, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 444 days.

(21) Appl. No.: 14/433,446

(22) PCT Filed: Oct. 7, 2013

(86) PCT No.: PCT/FR2013/052376
§ 371 (c)(1),
(2) Date: Apr. 3, 2015

(87) PCT Pub. No.: WO2014/053794
PCT Pub. Date: Apr. 10, 2014

(65) Prior Publication Data
US 2015/0290976 A1   Oct. 15, 2015

(30) Foreign Application Priority Data
Oct. 5, 2012 (FR) .................................. 12 59462

(51) Int. Cl.
*B29D 30/24* (2006.01)
*B60C 9/02* (2006.01)
*B29K 21/00* (2006.01)

(52) U.S. Cl.
CPC .............. *B60C 9/023* (2013.01); *B29D 30/24* (2013.01); *B29D 30/242* (2013.01); *B29K 2021/00* (2013.01)

(58) Field of Classification Search
CPC .................... B29D 30/12; B29D 30/24; B29D 30/244–30/248; B29D 30/26;
(Continued)

(56) References Cited

U.S. PATENT DOCUMENTS 1,879,063 A * 9/1932 Bruck ................. B29D 30/248
                                                                  156/416
1,921,594 A * 8/1933 Thompson ............. B29D 30/44
                                                                  156/421.8
(Continued)

FOREIGN PATENT DOCUMENTS

CN          2521029 Y      11/2002
CN       201872357 U       6/2011
(Continued)

OTHER PUBLICATIONS

Written Opinion of the International Search Authority PCT/FR2013/0052376 dated Apr. 5, 2015.
(Continued)

*Primary Examiner* — Geoffrey L Knable
(74) *Attorney, Agent, or Firm* — Dickinson Wright PLLC (57) ABSTRACT

The device for producing a tire component by winding, comprises:
  a helicoidal external wall, and
  means for adjusting a diameter of the wall.

26 Claims, 8 Drawing Sheets

(58) Field of Classification Search
CPC .............. B29D 30/2642; B29D 30/265; B29D 30/2657; B29D 30/242
See application file for complete search history.

(56) References Cited

U.S. PATENT DOCUMENTS

| | | | |
|---|---|---|---|
| 3,932,256 A | 1/1976 | Touchette | |
| 3,971,694 A * | 7/1976 | Gazuit | B29D 30/245 156/132 |
| 4,060,445 A | 11/1977 | Houck et al. | |
| 4,330,916 A * | 5/1982 | Dannatt | B25B 27/30 29/227 |
| 4,553,545 A * | 11/1985 | Maass | A61F 2/01 267/167 |
| 4,647,072 A * | 3/1987 | Westman | B25B 27/02 138/97 |
| 4,923,554 A | 5/1990 | Ozawa | |
| 4,929,298 A | 5/1990 | Van Der Poel | |
| 5,147,370 A * | 9/1992 | McNamara | A61F 2/88 606/108 |
| 2010/0116414 A1 | 5/2010 | Marchini et al. | |
| 2011/0303366 A1 | 12/2011 | Byerley | |
| 2012/0073728 A1 | 3/2012 | Takasuga | |
| 2012/0073732 A1* | 3/2012 | Perlman | B29C 33/485 156/196 |

FOREIGN PATENT DOCUMENTS

| | | |
|---|---|---|
| CN | 202045887 U | 11/2011 |
| SU | 1509278 A1 * | 9/1989 |

OTHER PUBLICATIONS

International Search Report for PCT/FR/052376 dated Jan. 20, 2014.

* cited by examiner

DEVICE FOR THE PRODUCTION OF TREAD OF A TIRE CASING

This application is a 371 national phase entry of PCT/FR2013/052376, filed 7 Oct. 2013, which claims benefit of French Patent Application No. 1259462, filed 5 Oct. 2012, the entire contents of which are incorporated herein by reference for all purposes.

BACKGROUND

1. Field

The disclosure relates to devices for the manufacture of treads for tire casings.

2. Description of Related Art

To manufacture a cylindrical component that forms part of a green form of a tire, such as a tread for a tire casing for example, it is known practice to wind a strip of raw rubber onto a rotary cylindrical drum. Winding is performed over several tens of turns and at high speed. During the winding, the strip distribution means is moved in the axial direction of the drum relative to the said drum in order to form a build up of strip at the desired points and give the tread its overall shape.

It is necessary then to reduce the diameter of the drum in order to extract the said component, i.e. the tread, from it. Furthermore, it is preferable to be able to vary the diameter of the drum over a relatively large range in order to allow treads corresponding to different models of tire to be built on the same drum.

That being so, the external face of the drum on which face the rubber elements are laid needs as far as possible to have a cross section that is perfectly circular. In addition, because the rubber is raw and therefore fragile, this face must not have any reliefs or cavities liable to damage it.

Now, these various constraints are difficult to reconcile. Variable-diameter drums made up of elements of a cylinder of a given diameter which seek to achieve this are known but are unsatisfactory in so far as when the drum is brought to a diameter greater than or less than the diameter of the elements of which it is composed, the cross section of the drum is no longer a perfectly circular cross section.

SUMMARY

It is an object of an embodiment of the invention to provide a tire-building drum that has an external face the cross section of which is of circular overall shape and the diameter of which is variable.

To this end, an embodiment of the invention provides a device for producing a tire component by winding, which comprises:

a helicoidal external wall, and
means for adjusting a diameter of the wall.

Thus, this wall has an external face the overall shape of which is a particularly good approximation to that of a cylinder of circular cross section. Further, whatever the diameter chosen, the turns of the wall can be arranged edge to edge so that this face has neither significant reliefs nor cavities liable to damage the rubber.

For preference, the wall forms a spring.

This feature makes it easier to change the diameter of the wall because the stiffness of the spring tends to even out the overall shape of the wall so that it spontaneously approximates to that of a cylinder. In particular, it is mainly sufficient for the two ends of the wall to be manoeuvred with respect to one another and this wall will adopt the cylindrical configuration at the desired diameter.

Advantageously, the device is arranged in such a way that, in the configuration of the adjusting means that give the wall its smallest diameter, the wall has a minimum external diameter on the device that is greater than an external diameter that it has at rest off the device.

Thus, the tension applied in the turns of the spring has a tendency to oppose the increase in diameter of the turns. This choice makes it easier to manoeuvre the wall in order to modify the diameter.

For preference, the wall is made of aluminium.

The use of this metal in such a context offers numerous advantages. First of all, it is lightweight with respect to other metals, thus reducing the weight of the wall. Now, this wall is supported by a stand with a large portion of the device overhanging. This reduction in weight is therefore advantageous in the engineering of the device. In addition, because the drum is rotating at the time of tire building, the low mass of the aluminium makes it possible to reduce the moment of inertia of the rotary assembly. In return, this lightness of weight allows the wall to be of relatively large thickness so that its turns remain in contact with one another without overlapping. Further, with such thickness, the aluminium does not make the wall excessively stiff, making changes in diameter easier. Secondly, aluminium allows significant changes in diameter, for example in a ratio equal to two between the two extreme values. Finally, aluminium offers good thermal conductivity. Now, the strip of rubber is wound at high speed and is initially very hot. It is therefore important that it can reach ambient temperature as swiftly as possible. The thermal conductivity of aluminium facilitates this.

For preference, the device comprises a support, the wall having a first end immobilized against translational movement with respect to the support and a second end which is free to move translationally with respect to the support.

Thus, in order to increase the diameter, all that is required is for the second end to be manoeuvred with respect to the support. The fixing of the first end thereto implies that the wall then spontaneously adopts a position of equilibrium in the shape of a cylinder.

In an embodiment, the first end is articulated to the support.

If it is desirable for the turns to remain contiguous without overlapping whatever the diameter chosen, then each wall portion must be permitted to pivot. This articulation allows this pivoting.

Provision may be made for the support to comprise a peg able to press against various zones of a turn of the wall contiguous with the first end, according to a configuration adopted by the wall.

This peg makes it possible to define with precision the position of the first turn whatever the diameter chosen. It does not prevent the aforementioned pivot but limits the amplitude thereof in order for the wall to gain its cylindrical shape more rapidly.

Advantageously, the support comprises spacer pieces bearing the wall and mounted with the ability to move with respect to an axis of the device in a direction radial to the axis.

Provision may be made for the device to comprise link rods bearing each spacer piece.

For preference, the wall immobilizes the spacer pieces by friction against their moving away from the axis.

This immobilization increases the rigidity of the drum during winding. It also increases the stability of the wall.

Provision may be made for the device to comprise at least one member able to separate the wall and the support under the effect of vibrations produced by the said member.

Thus, the frictional immobilization can easily be interrupted when there is a desire to modify the diameter of the wall.

Advantageously, the device comprises at least one clamp able to maintain turns of the wall in mutual contact in an axial direction of the wall.

This clamp makes it possible to preserve the continuity of the external face of the wall in the axial direction.

Advantageously, the device comprises at least one clamp able to restrain a free end turn of the wall against its moving away from an axis of the wall.

This clamp prevents unwanted detachment of the free end turn. This maintaining is enough to prevent all of the other turns from detaching.

Provision may be made for the or each restraining clamp to be formed by the or one of the maintaining clamp(s).

For preference, the clamp or at least one of the clamps is mounted with the ability to move with respect to the wall in an axial direction of the wall.

The position of the clamp can thus easily be adapted to the chosen diameter.

Advantageously, the device comprises at least one actuator able to move the or each clamp with respect to the wall in an axial direction of the wall.

In one embodiment, the device comprises a fan able to circulate air through a chamber delimited by the wall.

This fan makes it easier to cool the device and the rubber wound thereonto.

For preference, the device comprises arms able to come to bear against an external face of the wall.

These arms may have different uses. Thus the majority of the wall can be made to bear uniformly against the arms all around the axis in order to facilitate changes in diameter and in particular, changes in configuration of the support in contact with the internal face of the wall. The arms therefore maintain the wall while the diameter of the support intended to support it is increased. In another use, the arms may be brought to bear uniformly against a green form of tread borne by the wall. The diameter of this wall can then be reduced and the green form extracted from the wall. This maintaining of the green form preserves its shape and integrity.

Provision may be made for the device to be arranged in such a way that the arms can be moved only simultaneously in a direction radial to an axis of the wall.

Advantageously, the device comprises a member able to fix a free end turn of the wall to one of the arms.

All that is therefore required is for the majority of the wall to be rotated with respect to the arms in order to obtain its change in diameter.

Advantageously, each arm bears rollers able to come into contact with the wall.

These rollers allow the wall to be rollered against the support once the latter has been placed in the configuration corresponding to the desired diameter for the wall.

In one embodiment, the rollers of each arm are mounted with the ability to move between a position in which they extend as a projection from the arm towards the axis and a position in which they do not extend as a projection from the arm towards the axis.

The rollers can thus be positioned so that they project in order to perform rollering. Further, they are retracted in order to bring them into the other position when the arms are to be used to support a green form of tread.

The invention, in an embodiment, also provides a method for increasing a diameter of the wall in a device according to the invention, in which:
two ends of the wall are turned one with respect to the other about an axis of the wall; and
a configuration of a support is altered to bring it into contact with an internal face of the wall.

Advantageously, turns of the wall are then tightened together in the axial direction.

The invention, in an embodiment, also provides a method for reducing a diameter of the wall in a device according to the invention, in which:
a configuration of a support is modified in order to interrupt contact between the support and an internal face of the wall, then
the wall is rollered onto the support.

The invention, in an embodiment, further provides a method for producing a tread of a tire casing, in which one or more rubber elements is or are applied to the wall of a device according to the invention.

Advantageously, with the arms being pressed against a green form of tread borne by the wall, a diameter of the wall is reduced.

Also provided is a method for manufacture of a wall of a device for producing a tread of a tire casing, in which:
a tube is manufactured; and
a helicoidal cut is made in the tube.

Advantageously, the tube is produced by rolling or forging.

In one embodiment, after the cutting step, the wall is machined to reduce the thickness thereof.

For preference, the wall is made of aluminium, for example of aluminium 7075 with a T6 treatment.

Also provided is a method of manufacturing a device for producing a tread of a tire casing, in which a method like the aforementioned is implemented and the wall is mounted on means for adjusting a diameter of the wall so that, in the configuration of the adjusting means that give it its smallest diameter, the wall has a minimum external diameter that is greater than the external diameter it has at rest off the device.

Finally, provided is a device for producing a tread of a tire casing which comprises a helicoidal external wall and means of adjusting a diameter of the wall, the device being arranged in such a way that in the configuration of the adjusting means that give it its smallest diameter, the wall has a minimum external diameter that is greater than its external diameter at rest off the device.

BRIEF DESCRIPTION OF DRAWINGS

One embodiment of a device according to the invention will now be described with reference to the attached drawings in which.

DETAILED DESCRIPTION OF SPECIFIC EMBODIMENTS

FIGS. 1 to 17 illustrate a device according to an embodiment of the invention used for the manufacture of a tread of a green form of vehicle tire casing.

A drum 4 of the device will be described first of all with reference to FIGS. 1 to 13, then an extractor of the device, used in conjunction with the drum, will be described with reference to FIGS. 14 to 17 and 19 to 20.

The drum 4 has an overall shape that exhibits symmetry of revolution of horizontal axis 6. It comprises a hub 8 by means of which the drum is mounted with the ability to rotate with respect to a stand, not illustrated, of the device, the axis of rotation being the axis 6.

Figure 1:
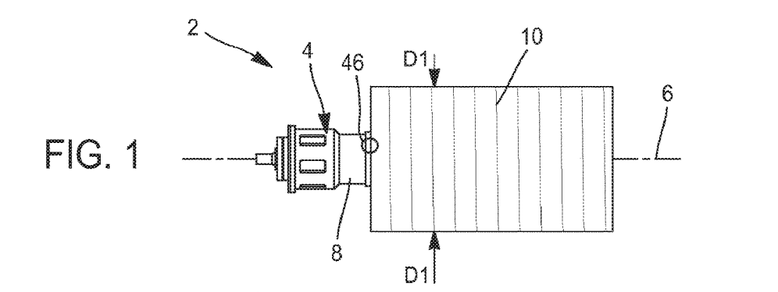
FIGS. 1 and 2 are side views of a drum of a device according to one embodiment of the invention, the drum respectively having its smallest and its largest diameter.
Figure 2:
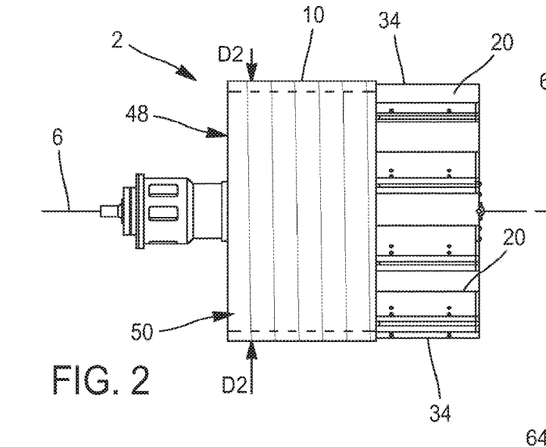
Figure 3:
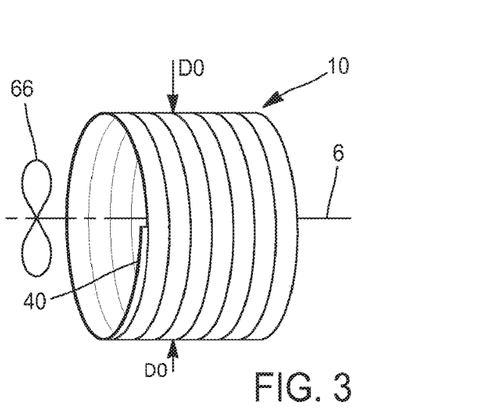
FIG. 3 is a perspective view of the wall of the drum of FIG. 1.

The drum comprises an external wall 10, illustrated notably in FIGS. 1 to 3. This wall has a cylindrical overall shape of axis 6 and a cross section that is circular in a plane perpendicular to the axis. This wall is made of metal, and in this particular instance of aluminium. In this instance it is aluminium referred to as 7075 with a T6 treatment.

The manufacture of this wall will be explained first of all.

Figure 17:
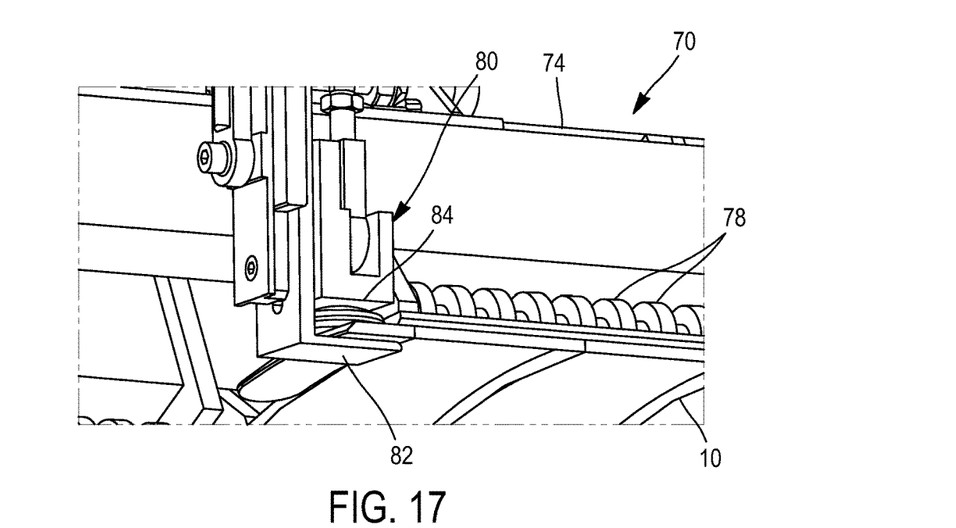
Figure 18:
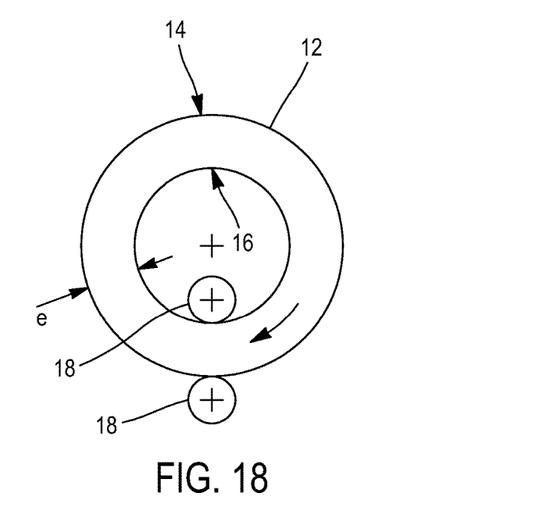
FIG. 18 is a diagram illustrating one step in the manufacture of the wall of the drum of FIG. 1.

A first step, with reference to FIG. 18, is the manufacture of a tube 12 having cylindrical external 14 and internal 16 walls the cross section of which is circular in a plane perpendicular to the axis of the tube. The tube is manufactured by rolling, as illustrated in FIG. 17, or by forging. For rolling, the tube is passed between two rolling rolls 18 pressing respectively against its internal and external faces. During this rolling, the thickness e of the tube decreases down to the desired value. Rolling has the advantage of increasing the strength of the component and of aligning the crystals in the correct direction.

A second step is to carry out a heat treatment of the tube by quenching at 475° C. for 5 hours and then tempering at 135° C. for 13 hours, these values being given merely by way of nonlimiting example. These operations make it possible to obtain the desired mechanical properties namely, in this particular instance, a tensile strength equal to 510 MPa and an elastic limiting tension equal to 430 MPa.

A later step is to rework this blank in order to thin the tube still further down to the thickness of the final component.

A later step is to cut the wall of the tube through the entire thickness of this wall from one of its axial ends to the other. The cut has a helicoidal shape and thus defines successive turns. This is performed using a tool oriented in a direction radial to the axis so that the turns have straight edges.

This method of manufacture, particularly machining from solid, makes it possible to obtain a component with no residual internal stresses and which has a good ability to be worked in the sense of opening, i.e. in the sense of enlarging its diameter.

The drum 4 comprises spacer pieces or segments 20, with an overall shape that is elongate in a direction parallel to the axis 6, which are identical to one another and evenly distributed about the axis 6. Each spacer piece 20 is connected to the hub by two link rods 22 visible notably in FIGS. 6 and 7. Each of these link rods has one end articulated directly to a respective end of the spacer piece about an axis 24 perpendicular to the axis 6 and parallel to the direction circumferential to this axis. The drum 4 comprises two rings 26 to which the other respective ends of the two link rods are articulated. The two rings 26 are mounted with the ability to slide on the hub 8 in the direction of the axis 6. Associated with each link rod 22 is a link rod 28 articulated on the one hand in the middle of the link rod 22 and, on the other hand, directly to the hub 4 without the possibility of this articulation sliding with respect to the hub along the axis 6.

The hub further comprises an axial screw 30 having two threads 29 oriented in opposite directions and with which the threads of the rings 26 engage. The screw is mounted with the ability to rotate with respect to the hub and is fixed in terms of sliding with respect to the latter. The device comprises motorizing means, not illustrated, that motorize the rotating of the screw.

Given this mechanism, the spacer pieces 20 can move in the radial direction only simultaneously in order to move away from or closer to the axis. At any moment, the spacer pieces all extend radially at the same distance from the axis.

Figure 4:
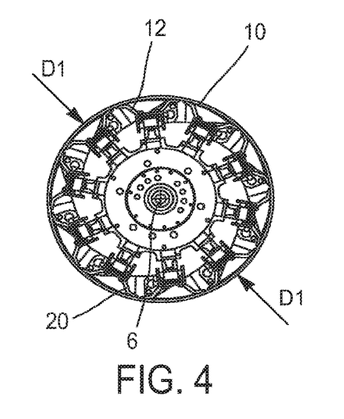
FIGS. 4 and 5 and 6 and 7 are end views and views in axial section of the drum in the configurations of FIGS. 1 and 2 respectively.
Figure 5:
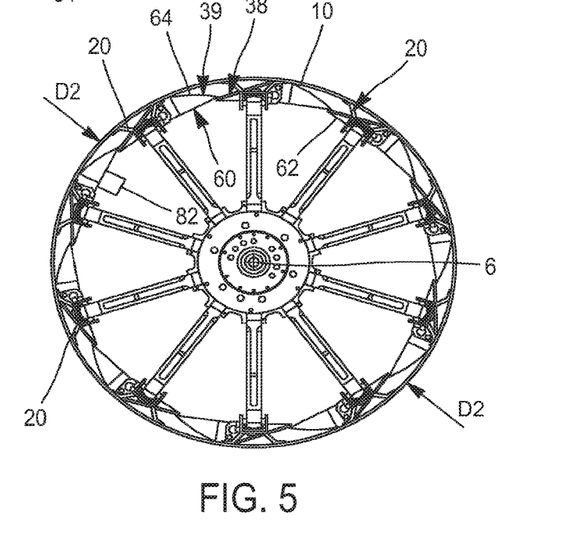
Figure 6:
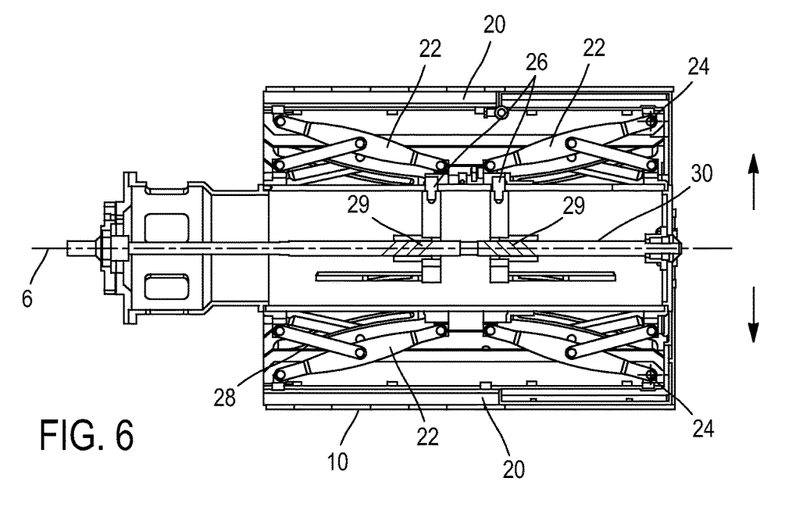
Figure 7:
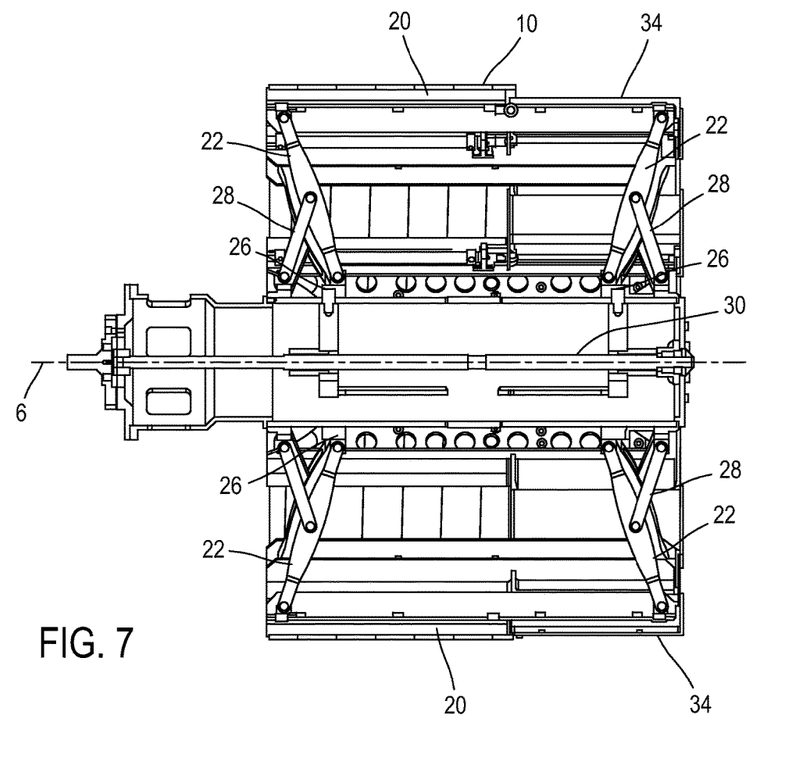

Starting out from the drum configuration illustrated in FIGS. 1, 4 and 6, the turning of the screw 30 causes the two rings 26 to move apart in sliding along the axis 6. The two rings therefore move closer to the respective ends of the drum. This movement is transmitted to the link rods and causes each spacer piece 20 to slide in the direction radial to the axis 6 in order to move away from this axis. This results in the drum configuration illustrated in FIGS. 2, 5 and 7. The drum has therefore been made to pass from the configuration in which the spacer pieces are as close together as possible and as close as possible to the axis, the wall 10 having its minimum external diameter D1, to the configuration in which the spacer pieces are as far apart as possible and as far away from the axis as possible, the wall having its maximum external diameter D2. Turning the screw in the opposite direction causes the rings to move closer together and the diameter of the wall to decrease. All diameter values intermediate between these two extremes can be obtained using the same movements.

Figure 8:
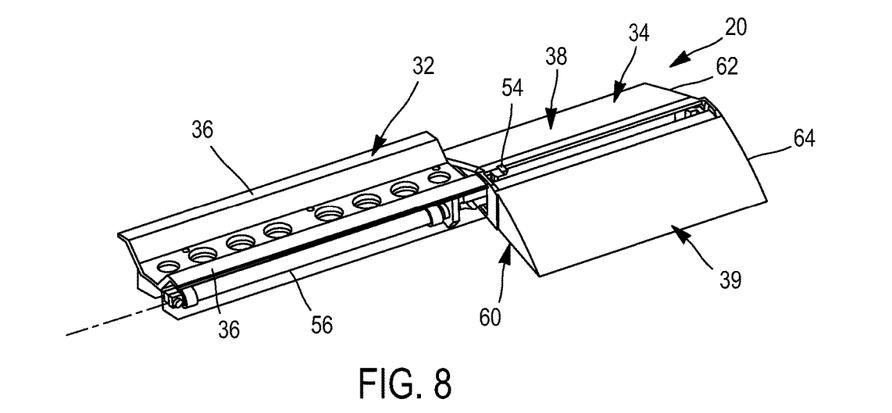
FIG. 8 is a perspective view of a spacer piece bearing the wall in the drum of FIG. 1.
Figure 9:
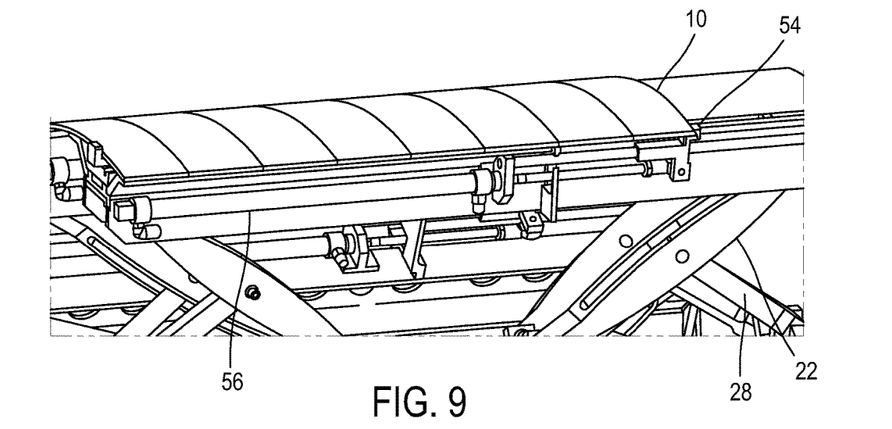
FIG. 9 is a perspective view with cutaway of part of the drum of FIG. 1.
Figure 10:
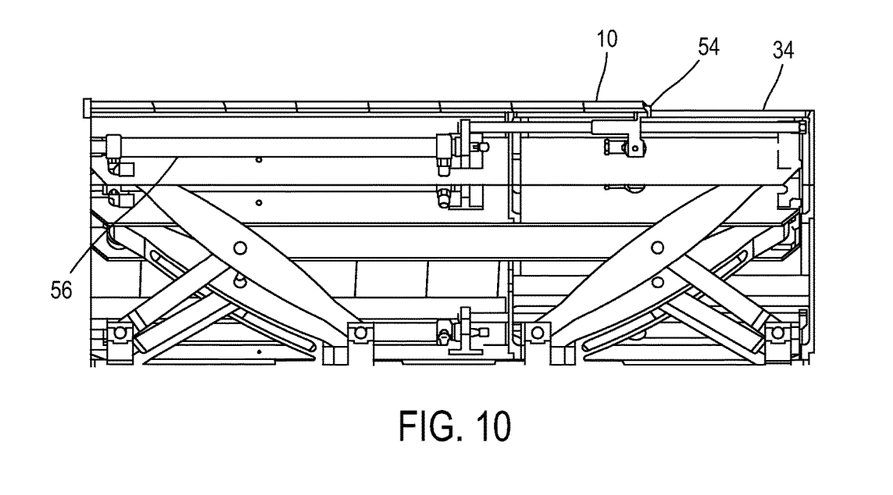
FIG. 10 is a view in axial section of part of the drum of FIG. 1.

One of the spacer pieces 20 has been illustrated in detail in FIG. 8. It comprises a bearing element 32 and a reserve element 34 which follow on from one another in a direction parallel to the axis 6. The bearing element 32 has a profiled overall shape with a V-shaped profile in the direction of the axis. The ends of the branches of the V are directed away from the axis. The reserve element 34 has two faces 38, 39 of rectangular overall shape giving it a profiled overall shape with a V-shaped profile but with the branches this time directed towards the axis. The bearing element 32 therefore offers two edges 36 that can support the wall 10, the latter straddling the space defined between these two edges. The reserve element 34 for its part offers the two faces 38, 39.

When the drum has its configuration of greatest diameter D2 as illustrated in FIG. 2, the wall 10 rests mainly on the bearing elements 32 without covering the major part of the reserve elements 34. The latter therefore, just like the wall 10, form part of the external face of the drum. When the drum is in its configuration of smallest diameter, as illustrated in FIG. 1, the wall 10 covers the entirety of the bearing elements and of the reserve elements so that none of these is visible any longer. The reduction in diameter of the wall is therefore compensated for by an increase in its length in the axial direction.

Figure 12:
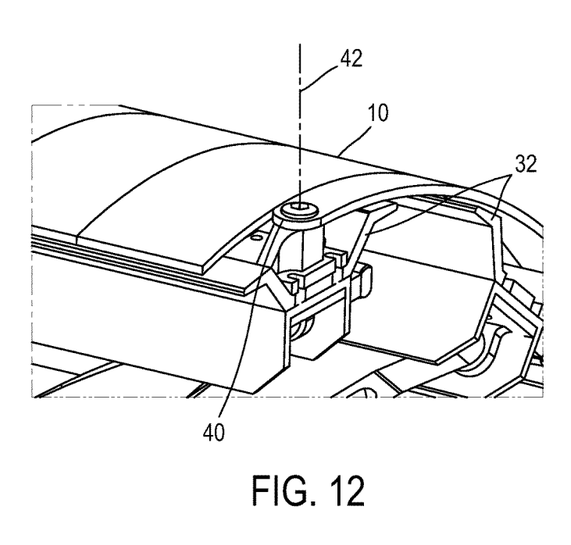
FIG. 12 is a view similar to FIG. 9 showing the fixing of the end of the drum to one of the spacer pieces.
Figure 13:
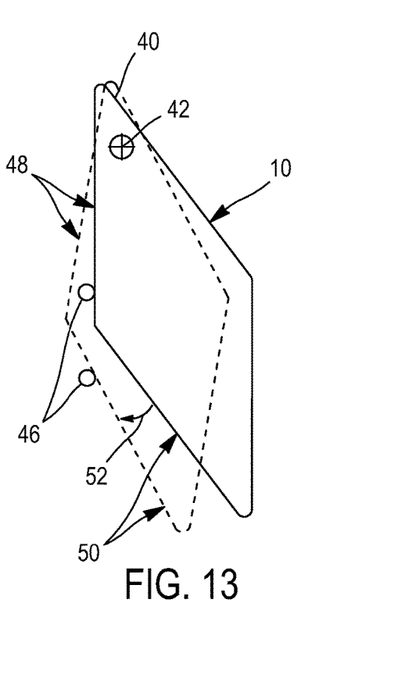
FIG. 13 is a diagram illustrating the rotation of the wall as the diameter is being varied.
Figure 14:
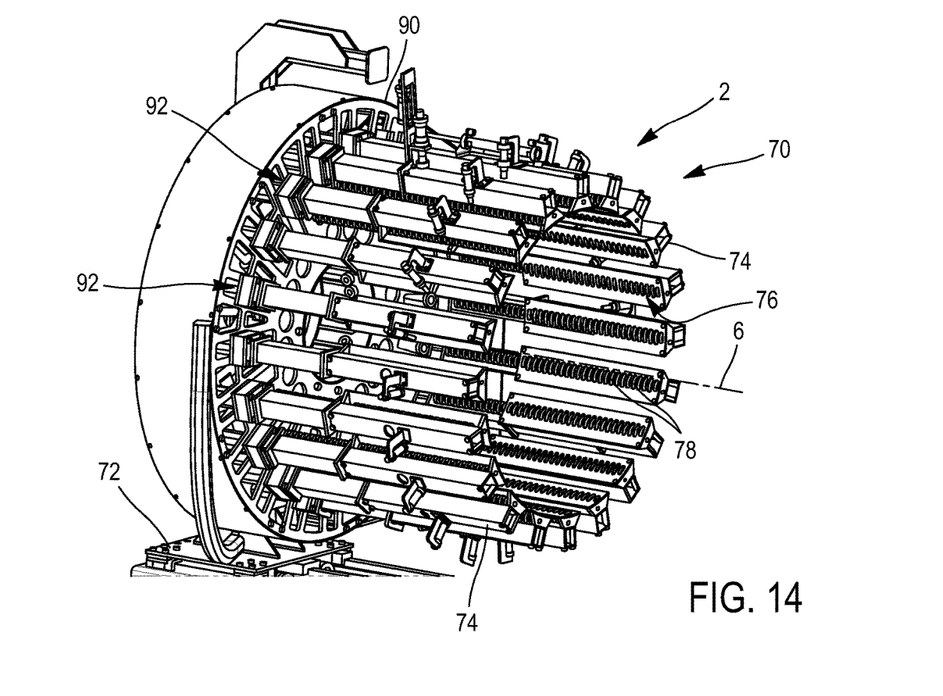
FIGS. 14 and 15 are respectively a perspective view and an end view of an extractor of the device of FIG. 1.
Figure 15:
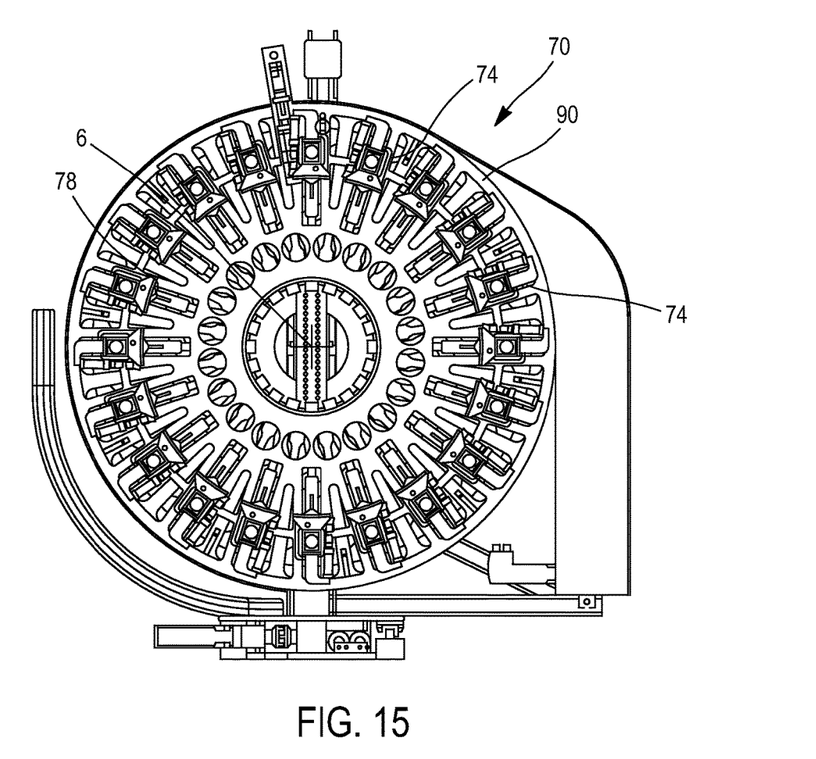

With reference to FIGS. 12 and 13, the end 40 of the helicoidal wall 10 which is closest to the stand, i.e. the end situated to the left in FIGS. 1 and 2, is articulated to the corresponding end of one of the spacer pieces so as to prevent any movement of this end in any direction with respect to the spacer piece except for its rotation about an axis 42 radial to the axis 6.

Another of the spacer pieces at its equivalent end bears a peg 46 extending as a radial projection from the spacer piece so that an external edge 48 of the first turn can bear against the peg. This edge has two portions succeeding one another along the turn and each has a straight developed shape. The portion 48 closest to the end of the turn is perpendicular to the axis 6 when the wall is at its smallest diameter. In this configuration, the other portion 50 is inclined with respect to the previous one and with respect to the axis 6. These two portions have been illustrated in FIG. 13, with the wall 10 having been given a very exaggerated shape in order to make it easier to visualize.

The peg is arranged in such a way that, when the wall 10 is in the smallest-diameter configuration illustrated in solid line in FIG. 13, the peg bears against the portion 48. By contrast, in the largest-diameter configuration illustrated in dotted line, the peg bears against the other portion. The transition from one of these configurations to the other takes place by means of a rotation of the end 40 about the axis 42 as illustrated by the arrow 52 in FIG. 13. The peg 46, collaborating with the fixing of this end of the wall, therefore makes it possible to limit the angular travel of the wall according to the configuration that it adopts.

The wall 10 has a second end which is not connected directly to the spacer pieces and is therefore free to move with respect to all of these.

Figure 11:
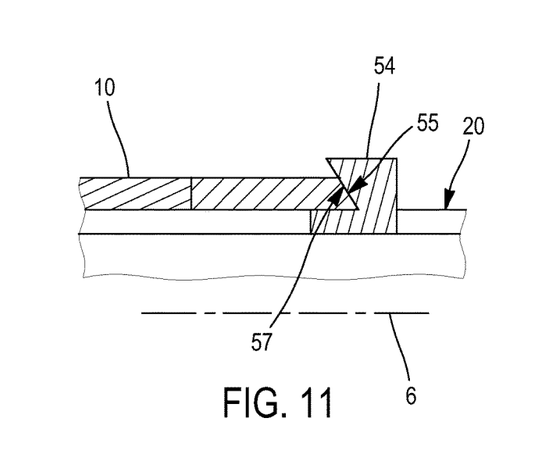
FIG. 11 is a partial view in axial section of the drum at one of the clamps.

With reference to FIG. 8, each spacer piece further comprises a clamp 54 mounted with the ability to move in sliding with respect to the spacer piece in a direction parallel to the axis 6. Each spacer piece further bears an actuator, formed in this particular instance by a pneumatic cylinder 56, defining the path of the clamp fixed to a rod of the cylinder mounted with the ability to slide in the body of the cylinder and producing the movement of the clamp. The drum comprises means, not illustrated, allowing control of the activation of the cylinders 56 and deactivation thereof. As illustrated in FIG. 11, the clamp takes the form of a hook able to come to bear in a radial direction and in the direction of the axis 6 against the edge 55 of the free end turn of the wall 10. For that reason, this edge 55 has a tapered shape and is directed away from the axis. In addition, the clamp 54 has a planar face 57 directed towards the axis to press against the edge 55, thus making a surface-to-surface contact. Bringing the two inclined faces of the edge of the turn and of the clamp into contact with one another allows each of the clamps to perform a dual function. On the one hand, under the action of the cylinder 56, each clamp 54 tends to move towards the first end turn and therefore to tighten the turns together in the direction of the axis 6. On the other hand, the clamps 54 maintain the free end turn bearing radially against the spacer pieces 20 and therefore prevent it from becoming detached under the effect of centrifugal force as the drum rotates. The clamps therefore allow all the turns of the wall 10 to be kept contiguous whatever the diameter of this wall.

The device thus offers a near-cylindrical surface that is continuous in the axial direction and the circumferential direction for the winding of rubber elements. This is a smooth and hard surface. In addition, by virtue of the freedom that this wall has to orientate itself with respect to the spacer pieces, notably through the articulation of its end 40, the turns do not angle themselves relative to one another or overlap, which means that the external face of the wall does not have any relief likely to damage the rubber elements.

The device is sized so that, in the configuration that gives the wall 10 its smallest external diameter D1, this diameter remains greater than the external diameter D0 that this wall has at rest before being mounted on the drum. The wall therefore spontaneously comes to bear against the spacer pieces. In addition, because all the parts are made of metal, the spacer pieces find themselves immobilized through friction with respect to the wall 10 against their moving away from the axis. That means that the spacer pieces cannot be commanded to move away from the axis without beforehand detaching the wall 10 from the spacer pieces. This immobilization further enhances the rigidity of the drum when used to support the winding of the strips.

In this example, the external diameter of the wall 10 in the configuration of FIG. 1 is equal to half its diameter in the configuration of FIG. 2.

The faces 38 and 39 form the external faces of two shoes 62, 64. The shoe 64 has a planar internal face 60 directed towards the axis and having an edge corner in common with the face 39. Whatever the configuration of the drum, including therefore the largest-diameter configuration, this face always bears via the outside against the face 38 of the shoe 62 of the adjacent spacer piece. During the movement of the spacer pieces in order to vary the diameter, the face 60 slides on the face 38 in the circumferential direction. The reserve elements 34 therefore form an external face which is always continuous in the circumferential direction and in the axial direction. The free end of the wall 10 remains bearing against any one of these elements without the risk of dipping inside the drum.

With reference to FIG. 3, provision may be made for the device to comprise a fan 66 fixed to the stand and able to circulate air inside the chamber delimited by the wall 10 and the spacer pieces, in the direction of the axis 6. The circulation of air thus created improves the cooling of the drum and therefore that of the rubber elements arranged thereon. It accelerates the transfer of heat from the rubber to the drum for better cooling of the green tire as it is being built.

FIGS. 14, 15, 16, and 17 and 19 and 20 illustrate part of the device 2 forming an extractor 70. This extractor is mounted with the ability to slide with respect to the drum 2. Provision may also be made for this extractor to be common to several devices 2 and associated at will with one or other of the drums by moving it opposite these as required. In what follows it will be assumed that the horizontal main axis of the extractor coincides with the axis 6.

The extractor comprises a chassis 72 and a set of arms 74 all identical to one another and of which there are in this particular instance 20, this value being nonlimiting. The arms have a horizontal rectilinear elongate profile shape. They are uniformly distributed about the axis 6 and extend opposite one another. The arms therefore define between them a chamber of cylindrical overall shape with a cross section the overall shape of which is circular in a plane perpendicular to the axis. The arms are mounted with overhang, all on the same side, from the chassis 72 so that the arms are each mounted with the ability to move in sliding on the chassis in a direction radial to the axis 6. At any given moment, all the arms extend at the same radial distance from the axis. The extractor is arranged in such a way that the arms can be moved in the radial direction only simultaneously and in the same direction so that all move closer to or further away from the axis. At any given moment in their movement, the arms are equidistant from the axis 6.

Each arm has a concave internal face 76 of cylindrical shape with a cross section that is circular in a plane perpendicular to the axis 6 and facing the latter. These faces are distant from one another in the direction circumferential to the axis.

Each arm comprises rollers 78 mounted with the ability to rotate with respect to a body of the arm about a common axis parallel to the axis 6. The face 76 has orifices through which the respective rollers can extend so that they project from the face towards the axis. In addition, the rollers of each arm are borne by a common member, not depicted and itself mounted with the ability to move with respect to the body of the arm. This member is able to make the rollers adopt two different positions. In the first position, the rollers extend projecting from the face 76 towards the axis 6. In the second, they do not extend projecting from this face and are housed wholly inside the arms. The extractor comprises centralized means for controlling and manoeuvring the rollers allowing all of them to be placed simultaneously in the same position.

Figure 16:
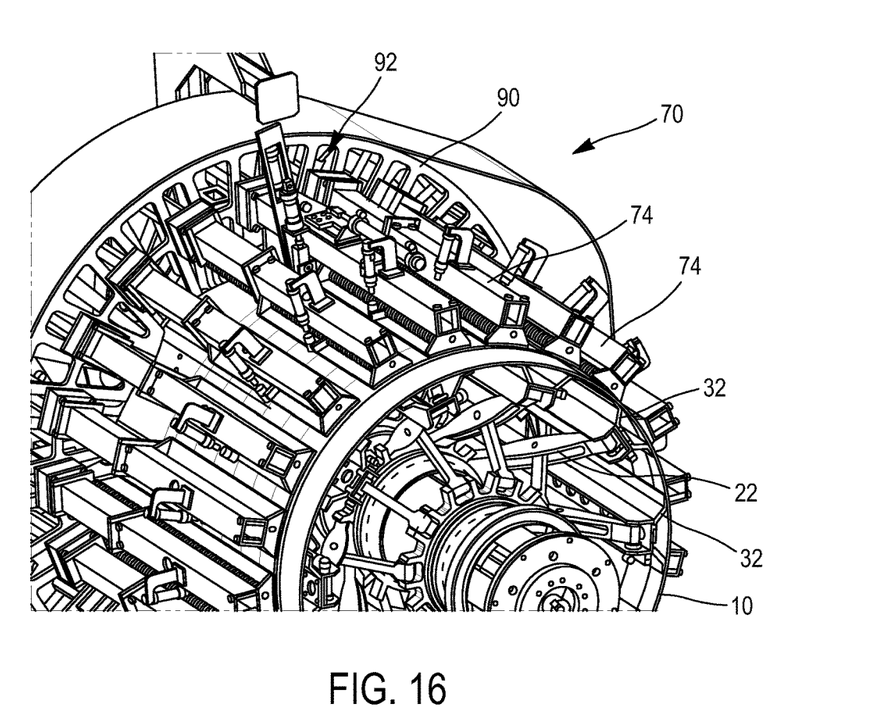
FIGS. 16 and 17 are perspective views of the extractor of FIG. 14 collaborating with the drum of FIG. 1.

The extractor is arranged in such a way as to be able to accommodate between the arms the entire portion of the drum bearing the wall 10, as illustrated in FIG. 16. In such a configuration, the wall 10, possibly with the green form of tread that it supports, extends facing the faces 76.

With reference to FIG. 17, one of the arms 74 is equipped with a retractable gripper 80 comprising two jaws 82, 84 able to move relative to one another in the radial direction and able to grip between them the free end of the wall 10 so as to immobilize it rigidly with respect to the corresponding arm.

In order to increase the diameter of the wall 10, the procedure can be as follows.

It is assumed that the drum is in the extractor, the wall 10 bearing no green form of tread. The gripper 80 rigidly immobilizes the free end of the wall 10 with respect to the corresponding arm. The arms of the extractor are positioned in such a way that the rollers 76 which are in the projecting position extend in contact with the face 10 or almost in contact therewith. The clamps are moved to move them away from the wall 10.

The drum is rotated with respect to the extractor about the axis 6 in the direction corresponding to the increase in diameter of the wall. That in particular causes the end of the wall 10 that is fixed to the drum to rotate with respect to its other end that is fixed to the extractor. That also leads to an increase in the diameter of the turns of the wall 10 which therefore come to bear against the rollers. At the same time, the arms 74 are made to move away so that the rollers accompany the movement of the turns. This positioning of the arms of the extractor allows the deformation of the turns of the shell to be distributed uniformly failing which there would be a risk that just a part of the turns would deform during the movement. At the same time, the moving of the spacer pieces away from the axis 6 is commanded. These operations are continued until the wall 10 reaches the desired external diameter.

Once this diameter has been reached, the free end of the wall is released by opening and removing the gripper 10, then the clamps 54 are actuated in order to tighten the turns of the wall together in the axial direction.

The drum is then extracted from the extractor.

In order to reduce the diameter of the wall 10, the procedure is as follows. It is assumed that the starting point is the same initial situation.

The spacer pieces are commanded to move closer to the axis 6. Because the wall 10 forms a spring, this wall naturally follows the reduction in dimension of its support so that the turns tighten up around the axis. Once the desired position of the spacer pieces is reached, the movement of the arms 74 is commanded to bring the rollers to bear against the wall 10. Rotation of the drum with respect to the extractor is then commanded in order to cause the rollers to roll them along this wall, ironing out the clearance between the wall and the spacer pieces. Finally, the repositioning of the clamps is commanded in order to tighten the turns together.

In order to create a tire casing tread, the diameter of the wall 10 is adapted as explained above in order to obtain the desired diameter. As the drum is situated outside the extractor, one or more rubber elements is or are then wound onto the wall 10 by causing the drum to rotate about its axis in order to form the green form of the tread. Once the green form has been created, the drum bearing the green form is introduced into the extractor, the rollers being in the retracted position and therefore not protruding from the faces 76. The arms of the extractor are then brought closer towards the axis in order to bring their faces 76 in contact with the green form and compress it in the radial direction. Once this contact has been made, the diameter of the wall 10 is reduced as explained above. To do that, in order to detach the green form from the wall 10, the latter is rotated in the direction in which the turns tighten onto the spacer pieces. During this operation, the green form remains in contact with the arms 74 against which it bears uniformly and becomes separated from the wall 10 the diameter of which is reducing. The drum can therefore be extracted from the green form and from the extractor. All that is then required is for the green form still present in the extractor to be recovered.

During later operations in the manufacture of the tire casing, this green form of tread will be assembled with other components of the tire to form a full green form intended to be cured so as, after vulcanising, to form a tire casing.

With reference to FIG. 5, provision may also be made for the device to be provided with vibrators 82 able, as a result of the vibrations that they produce, to detach the wall 10 from the spacer pieces 20 to facilitate their separation during changes in diameter. This alternative form may make it possible to dispense with the provision of an extractor for the changes in diameter. The vibrators may be positioned under the spacer pieces.

Provision may also be made for shoes provided with rolling members against which the wall comes to bear to be interposed between the wall 10 and the spacer pieces, the shoes being fixed to the spacer pieces. This arrangement considerably reduces friction between the wall and the spacer pieces and makes changes in diameter easier.

Figure 19:
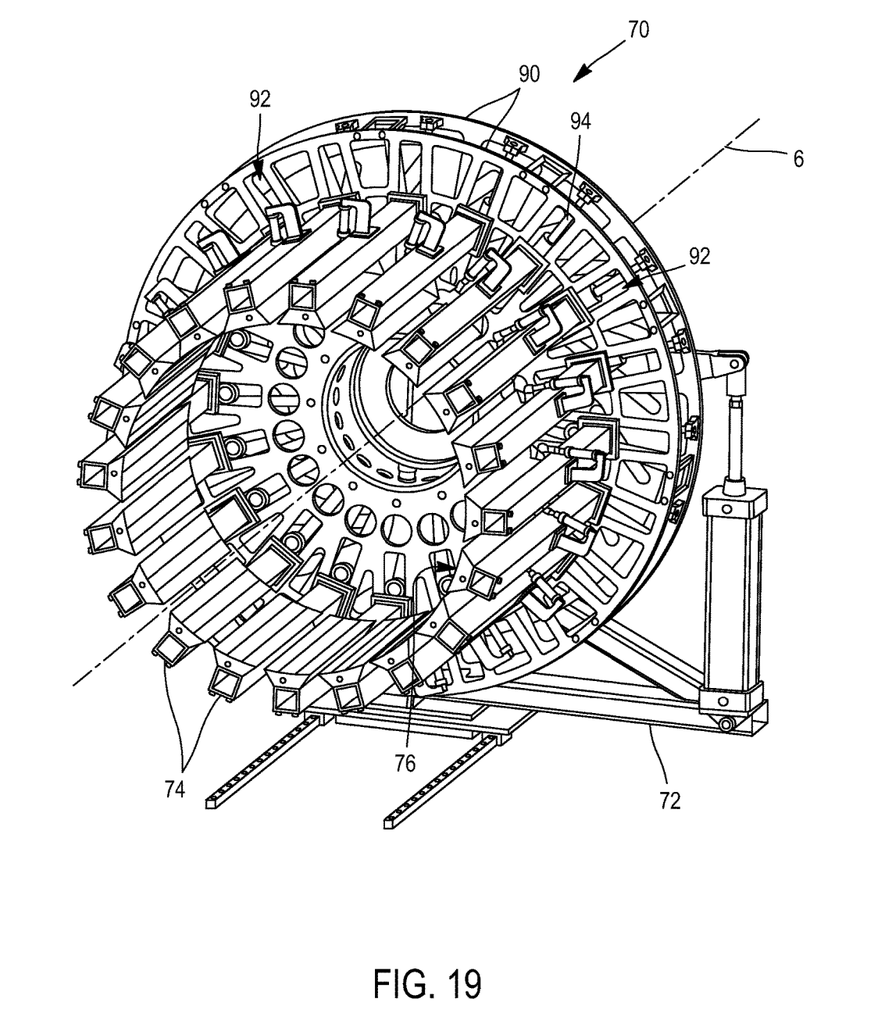
FIGS. 19 and 20 are two perspective views of the extractor showing the means of manoeuvring and guiding the arms.
Figure 20:
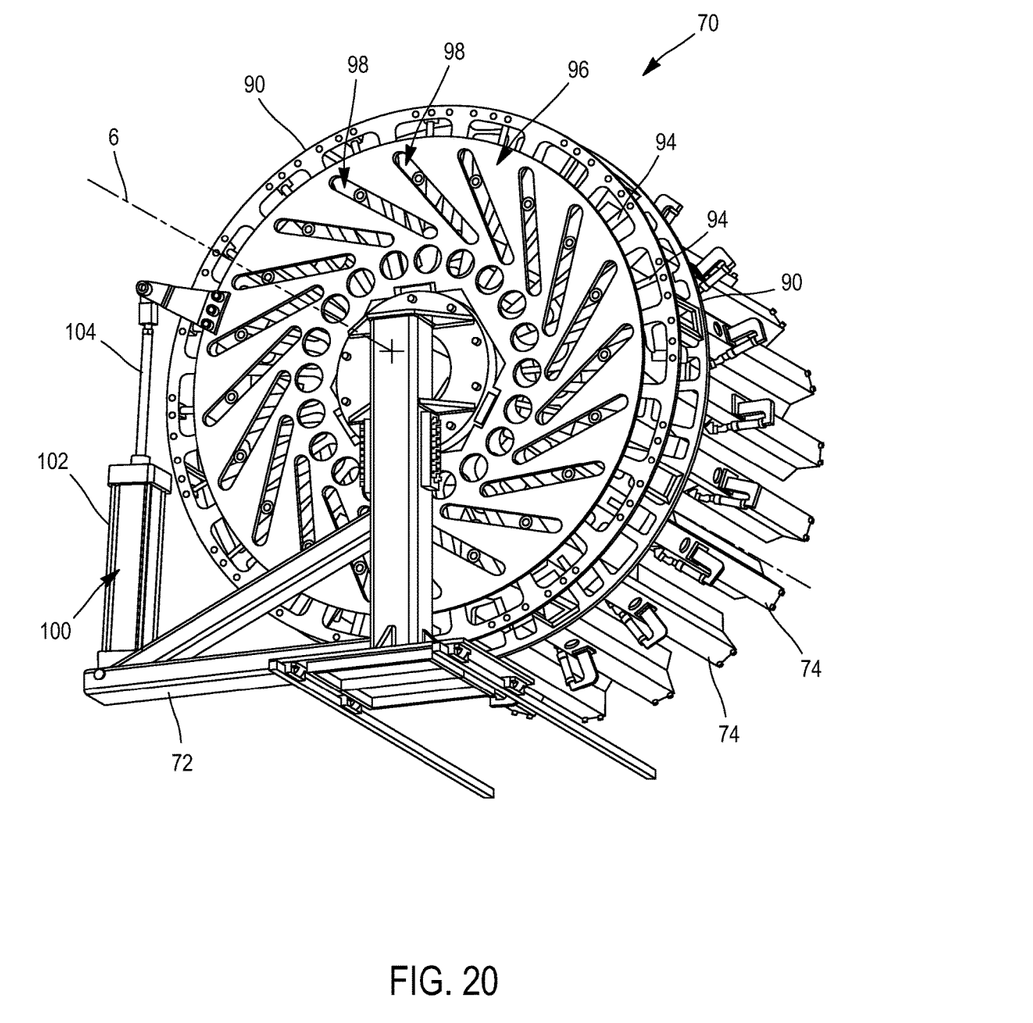

FIGS. 19 and 20 illustrate those members of the extractor that allow for the manoeuvring and movement of the arms 74.

The stand comprises two discs 90 of axis 6, rigidly fixed to the chassis 72. These discs are, to a large extent, identical to one another. They have the same diameter and are separated by a space in the direction of the axis 6.

The front disc has in its thickness identical through-openings 92 forming rectangular rectilinear guideways, the longitudinal direction of the rectangle extending in the radial direction. The number of guide ways is the same as the number of arms. Each arm has its rear end portion mounted with the ability to slide in the corresponding guideway in the radial direction.

The rear disc on the other hand comprises radial rods 94 likewise associated with the arms in a one-to-one relationship, each rod being mounted with the ability to move in sliding on the end portion of the corresponding arm. The rods are rigidly fixed to the rear disc.

The arms are therefore borne by the two discs and mounted with the ability to slide thereon in the radial direction.

The extractor further comprises a cam 96 which likewise has the form of a disc of axis 6. The cam is mounted with the ability to rotate about this axis with respect to the chassis 72 and with respect to the discs 90. The cam in its thickness has identical through-openings 98 forming rectilinear guideways, the longitudinal direction of each guideway being inclined with respect to the radial direction. The guideways 98 are the image of one another through rotation of axis 6 and constant angle. The number of guideways is the same as the number of arms. Each arm has its rear end portion mounted with the ability to slide in the corresponding guideway in the plane of the cam. Because the guideway 98 of each arm is inclined with respect to the guideway 90 of the same arm, the rotation of the cam 96 with respect to the discs 90 causes the arms to slide in a radial direction.

The extractor comprises motorizing means formed, in this particular instance, of a cylinder 100 comprising a body 102 articulated to the chassis 72 and a rod 104 articulated to the cam 96. The longitudinal direction of the cylinder is parallel to the overall plane of the cam and perpendicular to the axis 6 without being secant therewith. Sliding of the rod with respect to the body therefore causes the cam to rotate and the arms to slide radially. This mechanism therefore allows the arms to be moved simultaneously, the arms remaining equidistant from the axis at every moment in their movement.

Of course, numerous modifications may be made to the invention without departing from the scope thereof. For example, it may be possible to dispense with the provision of rollers on the extractor. Specifically, provision may be made for the rubber component or that of the turns to be rollered during the modification in diameter of the drum using a device having wheels or rollers which is independent of the extractor. The extractor then performs only the following two functions: on the one hand, during the increase in diameter of the drum, maintaining its helicoidal wall along its generatrix in order to ensure uniform deployment thereof so that all the turns have the same amplitude of movement, and secondly, during extraction of the rubber annular, the maintaining of the annular under tension so that it maintains its circular shape while the diameter of the drum is being reduced so as to prevent the annular from remaining stuck to the spring, accompanying the spring and becoming deformed.

Provision may also be made for the extractor to be used only for changes in diameter.

Although that is not as advantageous, the extractor could be provided with just one roller.

In addition, the roller or rollers could be mounted with the ability to move in the axial direction with respect to the chassis so as to perform rollering of various portions of the component.

The invention claimed is:

1. A device for producing a tire component by winding, comprising:
    a helicoidal external wall comprising a plurality of turns, each of said turns extending around an axis of rotation, said helicoidal external wall being rotatable around said axis of rotation to wind one or more rubber elements onto said helicoidal external wall, and said turns of said helicoidal wall providing an external face of said helicoidal external wall with a cylindrical overall shape; and
    a support comprising a plurality of spacer pieces which bear against an internal face of said helicoidal external wall, and said spacer pieces being movable radially inwardly towards said axis of rotation to allow a diameter of the helicoidal external wall to be reduced and being movable radially outwardly away from said axis of rotation to support the internal face as the diameter of the helicoidal external wall is increased.

2. The device according to claim 1, wherein the wall forms a spring.

3. The device according to claim 1, arranged in such a way that, in the configuration of the support that gives the wall its smallest diameter, the wall has a minimum external diameter on the plurality of spacer pieces that is greater than an external diameter that it has at rest off the rest of the device.

4. The device according to claim 1, in which the wall is made of aluminium.

5. The device according to claim 1, wherein the wall has a first end that is immobilized against translational movement with respect to the support and a second end which is free to move translationally with respect to the support.

6. The device according to claim 5, wherein the first end is articulated to the support.

7. The device according to claim 5, wherein the support comprises a peg able to press against various zones of a turn of the wall contiguous with the first end, according to a configuration adopted by the wall.

8. The device according to claim 5 which comprises at least one member able to separate the wall and the support under the effect of vibrations produced by the member.

9. The device according to claim 1, which further comprises link rods bearing each spacer piece.

10. The device according to claim 1, arranged in such a way that the wall immobilizes the spacer pieces by friction against their moving away from the axis.

11. The device according to claim 1, which further comprises at least one maintaining clamp able to maintain adjacent turns of the wall in mutual contact with one another in an axial direction of the wall.

12. The device according to claim 11, which further comprises at least one restraining clamp able to restrain a free end turn of the wall against its moving radially away from the axis of rotation, and wherein the or each restraining clamp is formed by the or one of the maintaining clamp(s).

13. The device according to claim 11, wherein the clamp or at least one of the clamps is mounted with the ability to move with respect to the wall in an axial direction of the wall.

14. The device according to claim 11 which further comprises at least one actuator able to move the or each clamp with respect to the wall in an axial direction of the wall.

15. The device according to claim 1, which further comprises at least one restraining clamp able to restrain a free end turn of the wall against its moving radially away from the axis of rotation.

16. The device according to claim 1, which further comprises a fan able to circulate air through a chamber delimited by the wall.

17. The device according to claim 1, which further comprises arms able to come to bear against the external face of the wall.

18. The device according to claim 17, arranged in such a way that the arms can be moved only simultaneously in a direction radial to an axis of the wall.

19. The device according to claim 17 which further comprises a member able to fix a free end turn of the wall to one of the arms.

20. The device according to claim 17, wherein each arm bears rollers able to come into contact with the wall.

21. The device according to claim 20, wherein the rollers of each arm are mounted with the ability to move between a position in which they extend as a projection from the arm towards the axis and a position in which they do not extend as a projection from the arm towards the axis.

22. A method for increasing a diameter of the wall in the device according to claim 1, wherein:
   two ends of the wall are turned one with respect to the other about an axis of the wall; and
   a configuration of the support is altered to bring it into contact with the internal face of the wall.

23. The method according to claim 22, wherein turns of the wall are then tightened together in the axial direction.

24. A method for reducing a diameter of the wall in the device according to claim 1, wherein:
   a configuration of the support is modified in order to interrupt contact between the support and the internal face of the wall, then
   the wall is rollered onto the support.

25. A method for producing a tread of a tire casing, wherein one or more rubber elements is or are applied to the wall of the device according to claim 1.

26. The method according to claim 25, wherein the device is a device further comprising comprises arms able to come to bear against the external face of the wall, wherein, with the arms being pressed against a green form of the tread borne by the wall, the diameter of the wall is reduced.

* * * * *